United States Patent
Song (10) Patent No.: US 12,346,598 B2
(45) Date of Patent: Jul. 1, 2025

(54) MEMORY STORING META DATA AND OPERATION METHOD OF MEMORY

(71) Applicant: SK hynix Inc., Gyeonggi-do (KR)

(72) Inventor: Choung Ki Song, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/525,868

(22) Filed: Dec. 1, 2023

(65) Prior Publication Data

US 2024/0272825 A1    Aug. 15, 2024

(30) Foreign Application Priority Data

Feb. 13, 2023  (KR) .................. 10-2023-0018658
Feb. 13, 2023  (KR) .................. 10-2023-0018659
Sep. 8, 2023   (KR) .................. 10-2023-0119421

(51) Int. Cl.
    *G06F 3/06*    (2006.01)
(52) U.S. Cl.
    CPC .......... *G06F 3/0656* (2013.01); *G06F 3/0659* (2013.01); *G06F 3/0604* (2013.01); *G06F 3/0688* (2013.01)

(58) Field of Classification Search
    CPC .... G06F 3/0656; G06F 3/0659; G06F 3/0604; G06F 3/0688
    USPC ................................................. 711/154, 100
    See application file for complete search history.

(56) References Cited

U.S. PATENT DOCUMENTS

2022/0121570 A1*   4/2022   Eilert .................. G06F 3/0659
2024/0126438 A1*   4/2024   Suh ..................... G06F 11/1048

\* cited by examiner

*Primary Examiner* — Hosain T Alam
*Assistant Examiner* — Zubair Ahmed
(74) *Attorney, Agent, or Firm* — IP & T GROUP LLP (57) ABSTRACT

An operation method of a memory may include receiving a meta data read command and a first address; reading meta data from memory cells in columns corresponding to the first address and storing the read meta data in a meta data buffer; receiving a normal read command and a second address; reading normal read data from memory cells in columns corresponding to the second address; and outputting the normal read data and a part of the meta data stored in the meta data buffer.

18 Claims, 8 Drawing Sheets

MEMORY STORING META DATA AND OPERATION METHOD OF MEMORY

CROSS-REFERENCE TO RELATED APPLICATION

This application claims priority under 35 U.S.C. § 119(a) to Korean Patent Application No. 10-2023-0018658 filed on Feb. 13, 2023, Korean Patent Application No. 10-2023-0018659 filed on Feb. 13, 2023, and Korean Patent Application No. 10-2023-0119421 filed on Sep. 8, 2023, which are incorporated herein by reference in their entirety.

BACKGROUND

1. Technical Field

Embodiments of the present disclosure relate to a memory that stores meta data together with normal data.

2. Related Art

Recently, as application fields utilizing artificial intelligence (AI) and big data increase, the amount of data to be processed is explosively increasing. Many computer systems (for example, data centers, servers, and the like) require a large amount of memory, and applications using the computer systems require a larger amount of memory than system capabilities. Furthermore, as the amount of data increases, the importance of meta data required for data management is gradually increasing.

Accordingly, a method for storing meta data in a memory in addition to normal data in an efficient manner is required.

SUMMARY

In an embodiment of the present disclosure, an operation method of a memory may include: receiving a meta data read command and a first address; reading meta data from memory cells coupled to columns corresponding to the first address and storing the read meta data in a meta data buffer; receiving a normal read command and a second address; reading normal read data from memory cells coupled to columns corresponding to the second address; and outputting the normal read data, and meta data corresponding to the normal read data from the meta data stored in the meta data buffer.

In an embodiment of the present disclosure, an operation method of a memory may include: receiving a meta data read command and a first address; reading meta data from memory cells coupled to columns corresponding to the first address and storing the read meta data in a meta data buffer; receiving a normal write command, a second address, normal write data, and write meta data; writing the normal write data to memory cells coupled to columns corresponding to the second address; replacing meta data selected by the second address from the meta data stored in the meta data buffer, with the write meta data; receiving a meta data write command; and writing the meta data stored in the meta data buffer to the memory cells coupled to the columns corresponding to the first address.

In an embodiment of the present disclosure, an operation method of a memory may include: receiving an active command and a first address; activating a row corresponding to the first address in response to the active command; reading meta data from meta data memory cells coupled to the row in response to the active command and storing the read meta data in a meta data buffer; receiving a normal read command and a second address; reading normal read data from memory cells coupled to columns corresponding to the second address in response to the normal read command; and outputting, in response to the normal read command, the normal read data, and meta data selected by the second address from the meta data stored in the meta data buffer.

In an embodiment of the present disclosure, an operation method of a memory may include: receiving an active command and a first address; activating a row corresponding to the first address in response to the active command; reading meta data from meta data memory cells coupled to the row in response to the active command and storing the read meta data in a meta data buffer; receiving a normal write command, a second address, normal write data, and write meta data; writing, in response to the normal write command, the normal write data to memory cells coupled to columns corresponding to the second address; replacing, in response to the normal write command, meta data selected by the second address from the meta data stored in the meta data buffer, with the write meta data; receiving a precharge command; writing, in response to the precharge command, the meta data stored in the meta data buffer to the meta data memory cells; and precharging the row corresponding to the first address in response to the precharge command.

In an embodiment of the present disclosure, a memory may include: a memory bank; a meta data buffer configured to receive meta data read from the memory bank and temporarily store the received meta data, during a meta data read operation; and a data input/output circuit configured to output normal data read from the memory bank, and meta data corresponding to the normal read data from the meta data stored in the meta data buffer, during a normal read operation.

DETAILED DESCRIPTION

Various embodiments of the present disclosure are directed to a method for efficiently storing meta data in a memory and accessing the meta data.

According to embodiments of the present disclosure, meta data may be efficiently stored in a memory and may be accessed.

Hereafter, embodiments in accordance with the technical spirit of the present disclosure will be described with reference to the accompanying drawings.

Figure 1:
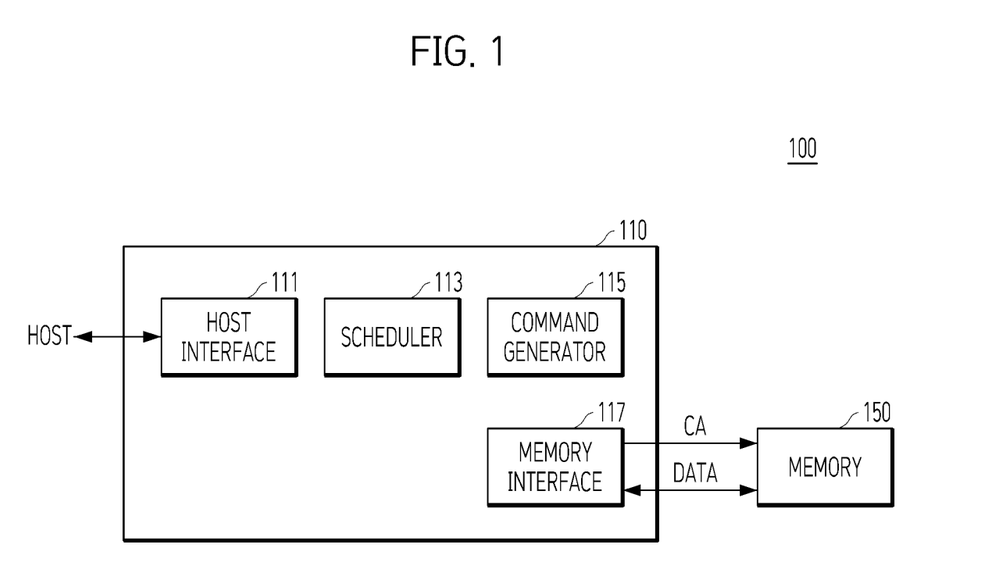
FIG. 1 is a diagram illustrating a configuration of a memory system in accordance with an embodiment of the present disclosure.

FIG. 1 is a diagram illustrating a configuration of a memory system 100 in accordance with an embodiment of the present disclosure.

Referring to FIG. 1, the memory system 100 may include a memory controller 110 and a memory 150.

The memory controller 110 may control operations of the memory 150 according to a request from a host. The host may include at least one of various processors such as a central processing unit (CPU), a graphics processing unit (GPU), an application processor (AP), and the like. The memory controller 110 may include a host interface 111, a scheduler 113, a command generator 115, and a memory interface 117. The memory controller 110 may also be included in a processor such as a CPU, a GPU, or an AP. In this case, the host may refer to components, other than the memory controller 110, among internal components of the processor. For example, when the memory controller 110 is included in the CPU, the host in the drawing may represent remaining components of the CPU excluding the memory controller 110.

The host interface 111 may be provided for an interface between the memory controller 110 and the host.

The scheduler 113 may determine an order of requests to be instructed to the memory 150 among requests from the host. To improve the performance of the memory 150, the scheduler 113 may vary an order in which requests are received from the host and an order of operations to be instructed to the memory 150. For example, even though the host requests a read operation of the memory 150 first and a write operation later, an order may be adjusted so that the write operation is performed before the read operation.

The command generator 115 may generate a command to be applied to the memory 150 according to an order of operations, which is determined by the scheduler 113.

The memory interface 117 may be provided for an interface between the memory controller 110 and the memory 150. A command/address CA may be transmitted from the memory controller 110 to the memory 150 through the memory interface 117, and data DATA may be transmitted and received. The data DATA may include normal data and meta data corresponding to the normal data. The memory interface 117 is also referred to as a PHY interface.

The memory 150 may perform operations instructed by the memory controller 110. The operations instructed from the memory controller 110 may include an active operation, a precharge operation, a read operation, a write operation, a refresh operation, a meta data read operation, and a meta data write operation.

Figure 2:
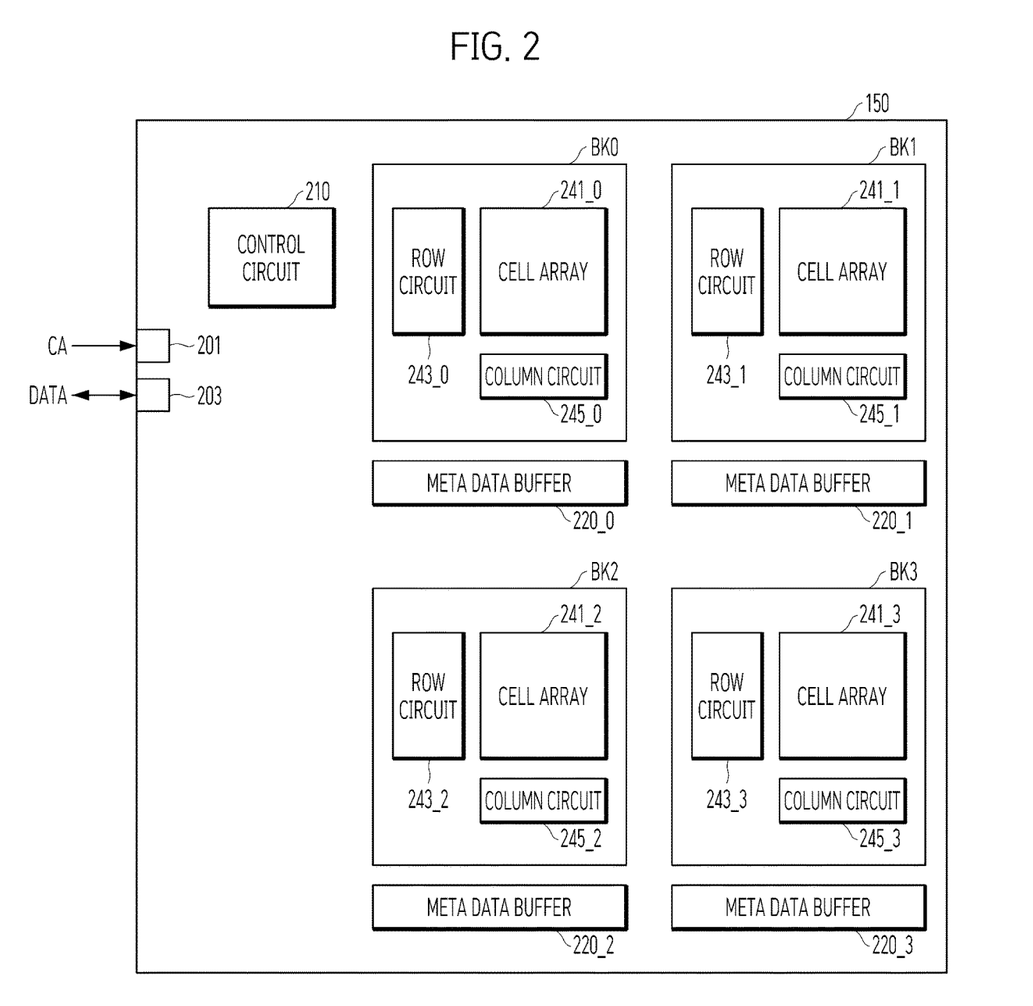
FIG. 2 is a detailed diagram illustrating an embodiment of a memory shown in FIG. 1.

FIG. 2 is a detailed diagram illustrating an embodiment of the memory 150 of FIG. 1.

Referring to FIG. 2, the memory 150 may include a command/address reception circuit 201, a data input/output circuit 203, a control circuit 210, memory banks BK0 to BK3, and meta data buffers 220_0 to 220_3.

The command/address reception circuit 201 may receive the command/address CA transmitted from the memory controller 110. The command/address CA may each include multi-bit signals.

The data input/output circuit 203 may transmit and receive the data DATA to and from the memory controller 110. The data DATA may be multi-bit, and may include normal data and meta data.

The control circuit 210 may control the overall operation of the memory 150. The control circuit 210 may control the internal components of the memory 150 so that the memory 150 may perform operations instructed by the command/address CA. The operations performed by the memory 150 include an active operation, a precharge operation, a read operation, a write operation, a refresh operation, a meta data read operation, a meta data write operation, and the like.

The memory bank BK0 may include a cell array 241_0, a row circuit 243_0, and a column circuit 245_0. The memory bank BK1 may include a cell array 241_1, a row circuit 243_1, and a column circuit 245_1. The memory bank BK2 may include a cell array 241_2, a row circuit 243_2, and a column circuit 245_2. The memory bank BK3 may include a cell array 241_3, a row circuit 243_3, and a column circuit 245_3. FIG. 2 illustrates that the memory 150 includes four memory banks BK0 to BK3, however, the memory 150 may include a various number of memory banks such as 16 and 32.

Each of the cell arrays 241_0 to 241_3 may include a plurality of memory cells arranged in a plurality of rows and a plurality of columns.

The row circuits 243_0 to 243_3 may perform an active operation of activating a row selected by a row address, among the plurality of rows of the cell arrays 241_0 to 241_3. For example, the row circuit 243_0 may activate a row selected by a row address, in the cell array 241_0 during an active operation of the memory bank BK0, and the row circuit 243_3 may activate a row selected by a row address, in the cell array 241_3 during an active operation of the memory bank BK3. During the active operation, data of memory cells coupled to a selected row may be sensed and amplified. Furthermore, the row circuits 243_0 to 243_3 may refresh memory cells coupled to a row selected during a refresh operation.

The column circuits 245_0 to 245_3 may write data to memory cells coupled to columns selected by a column address, among the columns and rows selected by the row circuits 243_0 to 243_3 in the cell arrays 241_0 to 241_3, or read data from the memory cells coupled to the selected columns and selected rows. That is, the column circuits 245_0 to 245_3 may perform an operation of reading or writing data of memory cells corresponding to selected rows and selected columns in the cell arrays 241_0 to 241_3. For example, the column circuit 245_1 may write and read data to and from memory cells coupled to columns selected by a column address and a row selected by the row circuit 243_1 in the cell array 241_1.

The meta data buffers 220_0 to 220_3 may be provided for the memory banks BK0 to BK3, respectively. The meta data buffers 220_0 to 220_3 may be used to temporarily store meta data, which are read from the memory banks BK0 to BK3 and transmitted to the memory controller 110, or to temporarily store meta data that are received from the memory controller 110 and written to the memory banks BK0 to BK3.

Figure 3:
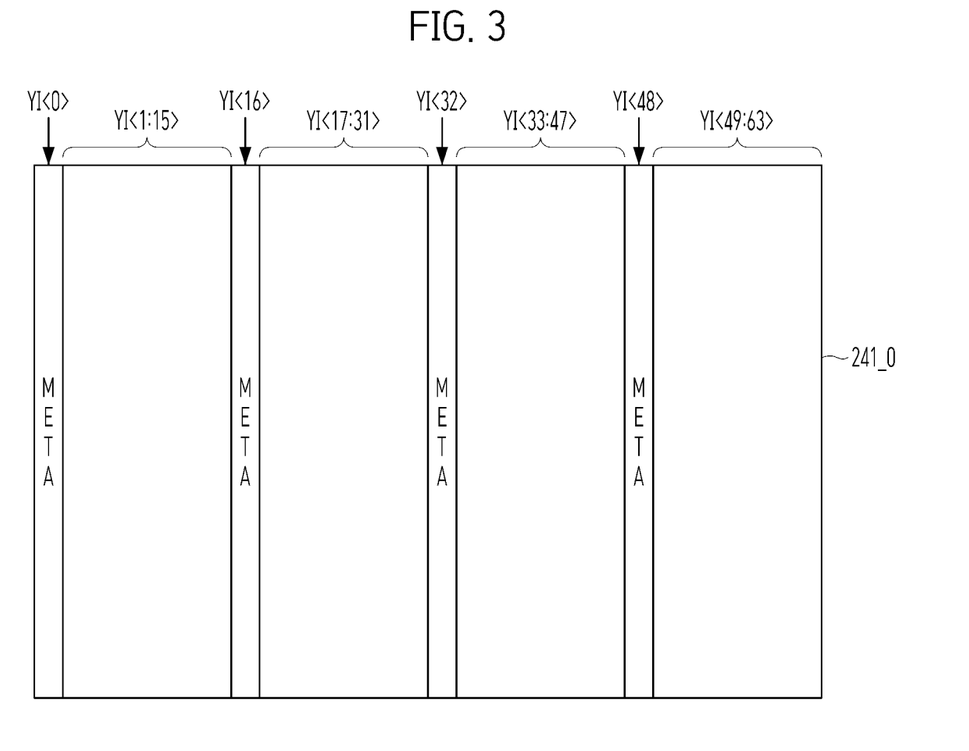
FIG. 3 is a detailed diagram illustrating a first embodiment of columns of a cell array shown in FIG. 2.

FIG. 3 is a detailed diagram illustrating a first embodiment of the configuration of the columns of the cell array 241_0 of FIG. 2. In FIG. 3, during read and write operations of the memory 150, 120-bit normal data is read and written and 8-bit meta data is read and written. The cell arrays 241_1 to 241_3 of FIG. 2 may be configured the same as the cell array 241_0 of FIG. 3.

Referring to FIG. 3, column selection signals YI<0:63> may be used to select columns in the cell array 241_0. During the read and write operations, one of the column selection signals YI<0:63> may be activated, and 128 columns corresponding to the activated column selection signal may be accessed. For example, in a state in which row 123 is activated (selected), when the column selection signal YI<37> is activated, 128 memory cells corresponding to the column selection signal YI<37>, may be accessed in the cell array 241_0.

Columns corresponding to the column selection signals YI<0>, YI<16>, YI<32>, and YI<48> in the cell array 241_0 may be used to store meta data. When 120-bit normal data is read and written and 8-bit meta data is read and written during the read and write operations of the memory 150, that is, when the ratio of normal data to meta data is 120:8, because an area corresponding to 1/16 of the cell array 241_0 needs to be allocated for meta data, columns corresponding to the column selection signals YI<0>, YI<16>, YI<32>, and YI<48> are used to store meta data. Meta data, corresponding to normal data stored in columns corresponding to the column selection signals YI<1:15>, may be stored in the columns corresponding to the column selection signal YI<0>; and meta data, corresponding to normal data stored in columns corresponding to the column selection signals YI<17:31>, may be stored in the columns corresponding to the column selection signal YI<16>. Likewise, meta data, corresponding to normal data stored in columns corresponding to the column selection signals YI<33:47>, may be stored in the columns corresponding to the column selection signal YI<32>; and meta data, corresponding to normal data stored in columns corresponding to the column selection signals YI<49:63>, may be stored in the columns corresponding to the column selection signal YI<48>.

Figure 4:
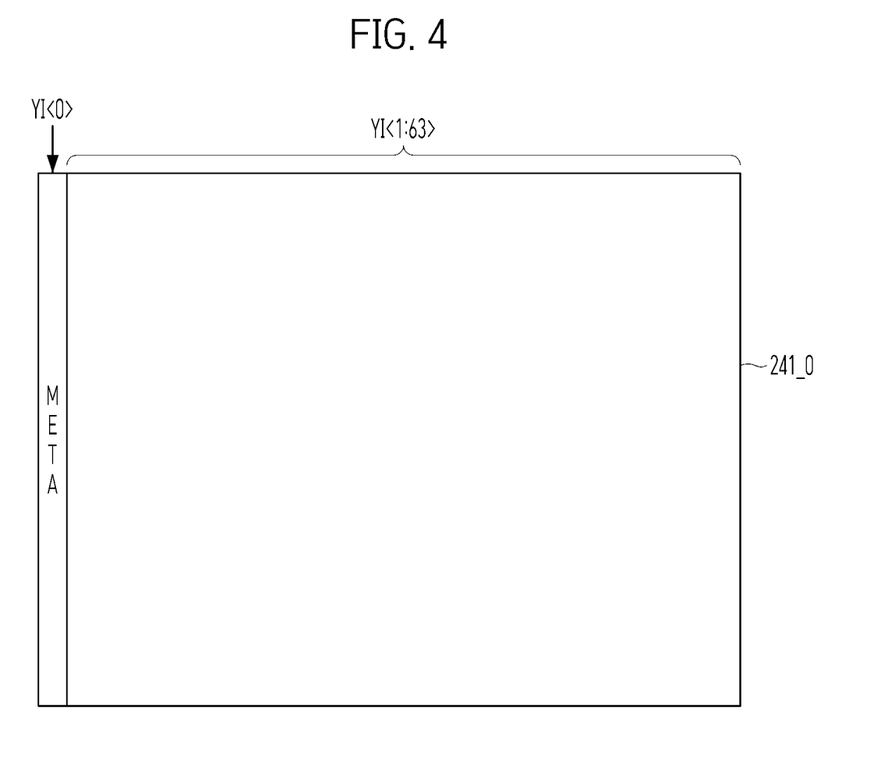
FIG. 4 is a detailed diagram illustrating a second embodiment of the columns of the cell array shown in FIG. 2.

FIG. 4 is a detailed diagram illustrating a second embodiment of the configuration of the columns of the cell array 241_0 of FIG. 2. In FIG. 4, during read and write operations of the memory 150, 126-bit normal data is read and written and 2-bit meta data is read and written. The cell arrays 241_1 to 241_3 of FIG. 2 may be configured the same as the cell array 241_0 of FIG. 4.

Referring to FIG. 4, column selection signals YI<0:63> may be used to select columns in the cell array 241_0. During the read and write operations, one of the column selection signals YI<0:63> may be activated, and 128 columns corresponding to the activated column selection signal may be accessed.

Columns corresponding to the column selection signal YI<0> in the cell array 241_0 may be used to store meta data. When 128-bit normal data is read and written and 2-bit meta data is read and written during the read and write operations of the memory 150, that is, when the ratio of normal data to meta data is 126:2, because an area corresponding to 1/64 of the cell array 241_0 needs to be allocated for meta data, the columns corresponding to the column selection signal YI<0> are used to store meta data. Meta data, corresponding to normal data stored in columns corresponding to the column selection signals YI<1:63>, may be stored in the columns corresponding to the column selection signal YI<0>.

Figure 5:
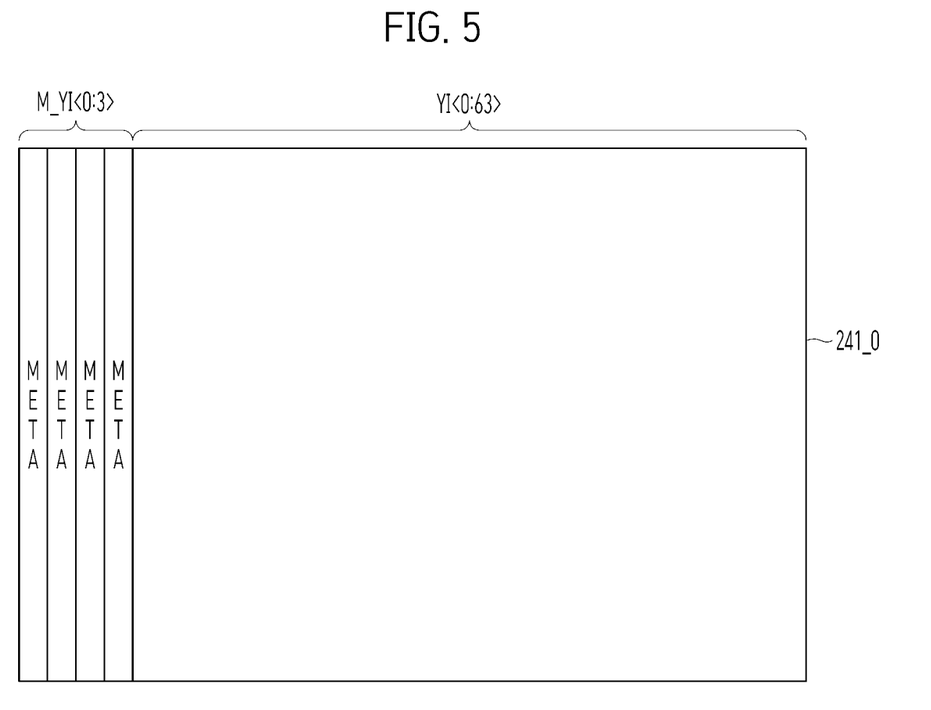
FIG. 5 is a detailed diagram illustrating a third embodiment of the columns of the cell array shown in FIG. 2.

FIG. 5 is a detailed diagram illustrating a third embodiment of the configuration of the columns of the cell array 241_0 of FIG. 2. In FIG. 5, during read and write operations of the memory 150, 128-bit normal data is read and written and 8-bit meta data is read and written. The cell arrays 241_1 to 241_3 of FIG. 2 may be configured the same as the cell array 241_0 of FIG. 5.

Referring to FIG. 5, the cell array 241_0 may additionally include an area accessed by meta column selection signals M_YI<0:3> in addition to an area for storing normal data accessed by the column selection signals YI<0:63>. When one of the column selection signals YI<0:63> and the meta column selection signals M_YI<0:3> is activated, 128 columns corresponding to the activated signal may be accessed.

When 128-bit normal data is read and written and 8-bit meta data is read and written during the read and write operations of the memory 150, that is, when the ratio of normal data to meta data is 128:8, because the size of an area for storing the meta data needs to be 1/16 of the size of an area for storing the normal data, the number of column selection signals YI<0:63> may be 64 and the number of meta column selection signals M_YI<0:3> may be 4. Meta data corresponding to normal data stored in columns corresponding to the column selection signals YI<0:15> may be stored in the columns corresponding to meta column selection signal M_YI<0>; and meta data, corresponding to normal data stored in columns corresponding to the column selection signals YI<16:31>, may be stored in columns corresponding to the meta column selection signal M_YI<1>. Likewise, meta data, corresponding to normal data stored in columns corresponding to the column selection signals YI<32:47>, may be stored in columns corresponding to the meta column selection signal M_YI<2>; and meta data, corresponding to normal data stored in columns corresponding to the column selection signals YI<48:63>, may be stored in columns corresponding to the meta column selection signal M_YI<3>.

In the embodiment of FIG. 5, unlike the embodiment of FIG. 3, because a separate area for storing meta data is provided, the ratio of the area for storing the normal data and the area for storing the meta data may be exactly distributed at 128:8, and thus waste of the area of the cell array 241_0 may be avoided. However, when the memory system 100 stores only the normal data and no meta data in the cell array 241_0, the area for storing the meta data may be wasted.

Figure 6:
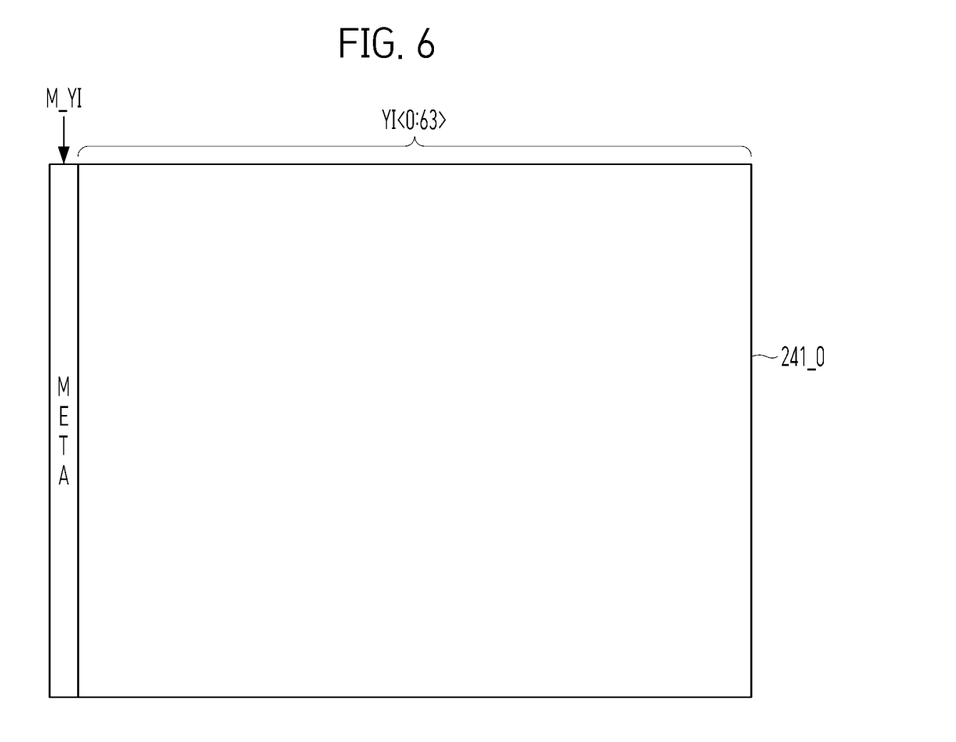
FIG. 6 is a detailed diagram illustrating a fourth embodiment of the columns of the cell array shown in FIG. 2.

FIG. 6 is a diagram illustrating a fourth embodiment of the configuration of the columns of the cell array 241_0 of FIG. 2. In FIG. 6, during read and write operations of the memory 150, 128-bit normal data is read and written and 2-bit meta data is read and written. The cell arrays 241_1 to 241_3 of FIG. 2 may be configured the same as the cell array 241_0 of FIG. 6.

Referring to FIG. 6, the cell array 241_0 may additionally include an area accessed by the meta column selection signal M_YI in addition to an area for storing normal data accessed by the column selection signals YI<0:63>. When one of the column selection signals YI<0:63> and the meta column selection signal M_YI is activated, 128 columns corresponding to the activated signal may be accessed.

When 128-bit normal data is read and written and 2-bit meta data is read and written during the read and write operations of the memory 150, that is, when the ratio of normal data to meta data is 128:2, because the size of an area for storing the meta data needs to be 1/64 of the size of an area for storing the normal data, the number of column selection signals YI<0:63> may be 64 and the number of meta column selection signal M_YI may be 1. Meta data, corresponding to normal data stored in columns corresponding to the column selection signals YI<0:63>, may be stored in columns corresponding to the meta column selection signal M_YI.

In the embodiment of FIG. 6, unlike the embodiment of FIG. 4, because an area for storing meta data is separately provided, the ratio of the area for storing the normal data and the area for storing the meta data may be exactly distributed at 128:2, and thus waste of the area of the cell array 241_0 may be avoided. However, when the memory system 100 stores only the normal data and no meta data in the cell array 241_0, the area for storing the meta data may be wasted.

Referring again to FIGS. 2 to 6, various operations of the memory 150 will be described.

Active Operation

The active operation may be started when the memory controller 110 applies, to the memory 150, an active command, a bank address for selecting a memory bank to perform the active operation, and a row address for selecting a row to be activated within the selected memory bank. For example, when an active command, a bank address designating the memory bank BK2, and a row address for designating row 100 are applied to the memory 150, the row circuit 243_2 of the memory bank BK2 may select and activate the row 100 of the cell array 241_2. During the active operation, data of memory cells coupled to a selected row of a selected memory bank may be sensed and amplified.

A precharge operation may be an operation of ending the active operation. That is, the active operation may be ended when the memory controller 110 applies a precharge command and a bank address to the memory 150. For example, in a state in which row 3 of the memory bank BK3 is activated, when a precharge command and a bank address for selecting the memory bank BK3 are applied, the row 3 of the memory bank BK3 may be precharged.

Meta Data Read Operation

The meta data read operation may be an operation of reading meta data of memory cells and storing the meta data in a meta data buffer. To perform the meta data read operation, a memory bank needs to be in an active state. For example, when the memory banks BK1 and BK2 are active in the memory 150, the meta data read operation of the memory banks BK1 and BK2 may be possible, but the meta data read operation of the memory banks BK0 and BK3 may not be possible.

The meta data read operation may be started when the memory controller 110 applies, to the memory 150, a meta data read command, a bank address for selecting a memory bank to perform the meta data read operation, and a column address for selecting columns from which meta data is to be read within the selected memory bank. In a state in which row 10 of the memory bank BK1 is activated, when a meta data read command, a bank address designating the memory bank BK1, and a column address designating columns storing meta data are applied, 128-bit meta data may be read from memory cells selected by a column address and coupled to the row 10 of the memory bank BK1, and then stored in the meta data buffer 220_1. During the meta data read operation, meta data may be read from memory cells selected by an address and merely stored in the meta data buffer 220_1, but may not be output to the outside of the memory 150.

Normal Read Operation

To perform the normal read operation, a memory bank needs to be in an active state. Furthermore, it may be required that the meta data read operation is performed once before the normal read operation and that meta data corresponding to normal data on which the normal read operation is to be performed is stored in the meta data buffer. For example, to perform the normal read operation of the memory bank BK2, the memory bank BK2 needs to be in an active state, and meta data corresponding to normal data stored in memory cells on which the normal read operation is to be performed in the memory bank BK2 may have to be already stored in the meta data buffer 220_2.

The normal read operation may be started when the memory controller 110 applies, to the memory 150, a normal read command, a bank address for selecting a memory bank to perform the normal read operation, and a column address for selecting columns from which normal data is to be read within the selected memory bank. In a state in which row 10 of the memory bank BK1 is activated and the meta data read operation has already been performed, when a normal read command, a bank address designating the memory bank BK1, and a column address designating columns storing normal data are applied, 128-bit normal data may be read from memory cells selected by a column address and coupled to the row 10 of the memory bank BK1, and output to the outside of the memory. Furthermore, out of 128-bit meta data stored in the meta data buffer 220_1, 8-bit (or 2-bit) meta data corresponding to 128-bit normal data may be output to the outside of the memory 150 subsequent to the normal data.

During the normal read operation, the normal data and the meta data may be continuously output. For example, 128 (=4*32)-bit normal data may be continuously output with a burst length (BL) of 32 through four data pads of the memory 150, and immediately 8 (=4*2)-bit meta data may be continuously output with a BL of 2 through the four data pads. When the meta data is 2 bits, after 128-bit normal data is continuously output, 2-bit meta data may be output with a BL of 1 through two of the four data pads.

Normal Write Operation

To perform the normal write operation, a memory bank needs to be in an active state. Like the normal read operation, the meta data read operation may be required to be performed once before the normal write operation.

The normal write operation may be started when the memory controller 110 applies, to the memory 150, a normal write command, a bank address for selecting a memory bank to perform the normal write operation, a column address for selecting columns to which normal data is to be written within the selected memory bank, normal write data, and write meta data. In a state in which row 10 of the memory bank BK1 is activated and the meta data read operation has already been performed, when a normal write command, a bank address designating the memory bank BK1, a column address designating columns in which normal data is to be stored, normal write data, and write meta data are applied, 128-bit normal data may be written to memory cells selected by a column address and coupled to the row 10 of the memory bank BK1. Furthermore, out of 128-bit meta data stored in the meta data buffer 220_1, 8-bit (or 2-bit) meta data may be replaced with write meta data.

The memory 150 may continuously receive the normal write data and the meta write data during the normal write operation. For example, the memory 150 may continuously receive 128 (=4*32)-bit normal write data with a burst length (BL) of 32 through four data pads, and may immediately receive 8 (=4*2)-bit write meta data with a BL of 2 through the four data pads continuously. When the meta data is 2 bits, the memory 150 may continuously receive 128-bit normal write data and then receive 2-bit meta data with a BL of 1 through two of the four data pads.

Meta Data Write Operation

The meta data write operation may be an operation of storing, in memory cells, meta data stored in the meta data buffer. To perform the meta data write operation, a memory bank needs to be in an active state, and the meta data read operation may be required to be performed once before the meta data write operation.

The meta data write operation may be started when the memory controller 110 applies, to the memory 150, a meta data write command, a bank address for selecting a memory bank to perform the meta data write operation, and a column address for selecting columns in which meta data is to be written within the selected memory bank. In a state in which row 10 of the memory bank BK1 is activated, when a meta data write command, a bank address designating the memory bank BK1, and a column address designating columns, to which meta data is to be written, are applied, 128-bit meta data stored in the meta data buffer 220_1 may be written to memory cells selected by the column address and coupled to the row 10 of the memory bank BK1. The meta data write operation may be performed on the same memory cells as the memory cells on which the meta data read operation has been previously performed.

Figure 7:
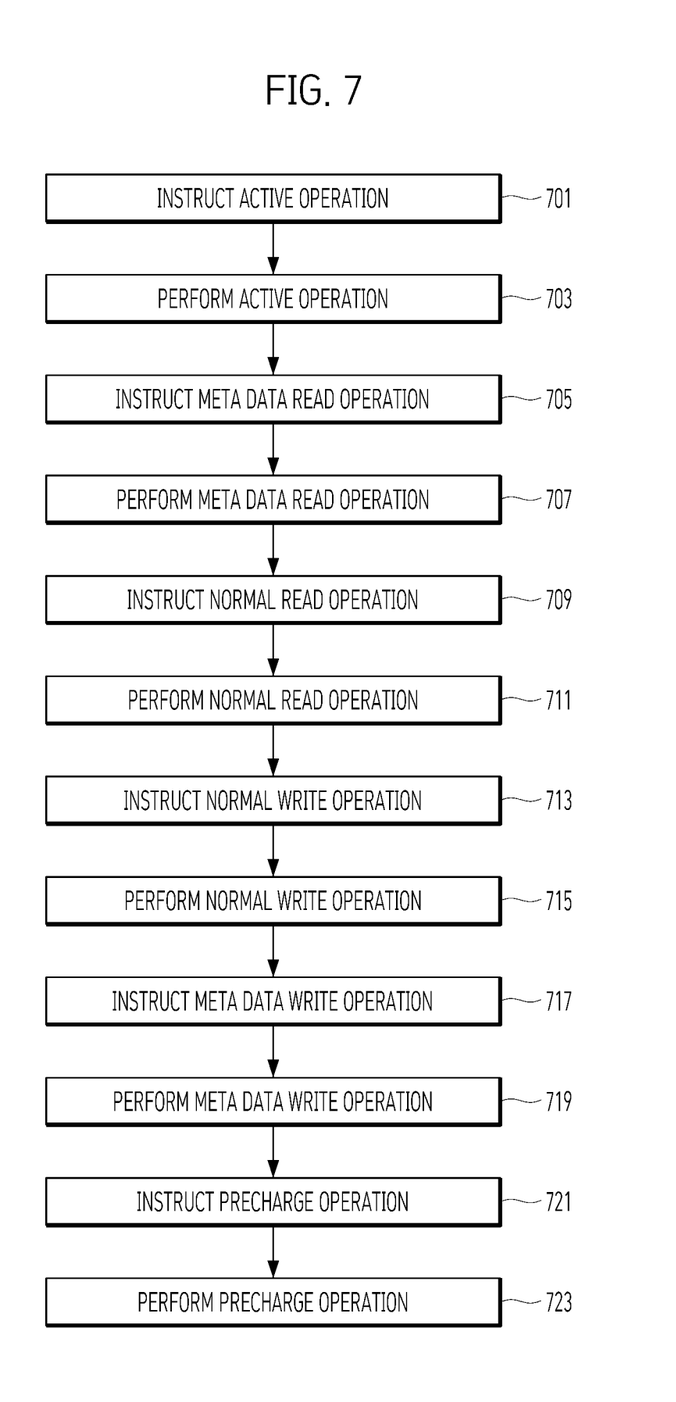
FIG. 7 is a flowchart illustrating an operation of the memory shown in FIG. 2 in accordance with an embodiment of the present disclosure.

FIG. 7 is a flowchart illustrating an embodiment of the operation of the memory 150 of FIG. 2. With reference to FIG. 7, an operation when 128-bit normal data is read and written and 8-bit-meta data is read and written during read and write operations of the memory 150 will be described. That is, with reference to FIG. 7, an operation when the cell arrays 241_0 to 241_3 are configured as illustrated in FIG. 3 or FIG. 5 will be described. The memory bank BK2 is selected in all operations performed in FIG. 7.

Referring to FIG. 7, an active operation of the memory 150 may be instructed first (operation 701). Specifically, the memory 150 may receive an active command, a bank address, and a row address transmitted from the memory controller 110.

The active operation may be performed in the memory 150 in response to the instruction of the operation 701 (operation 703). For example, row 72 selected by the row address in the cell array 241_2 of the memory bank BK2 selected by the bank address may be activated. During the active operation, data of memory cells coupled to the row 72 of the cell array 241_2 may be sensed and amplified.

A meta data read operation of the memory 150 may be instructed (at operation 705). The memory 150 may receive a meta data read command, a bank address, and a column address transmitted from the memory controller 110.

The meta data read operation may be performed in memory 150 in response to the instruction of the operation 705 (operation 707). For example, the memory bank BK2 may be selected by the bank address, and one column selection signal (for example, YI<16> in FIG. 3 or M_YI<1> in FIG. 5) selected by the column address may be activated, so that 128-bit meta data may be read from 128 memory cells corresponding to the column selection signal YI<16> or M_YI<1> and coupled to the row 72 of the cell array 241_2, and stored in the meta data buffer 220_2.

A normal read operation of the memory 150 may be instructed (operation 709). The memory 150 may receive a normal read command, a bank address, and a column address transmitted from the memory controller 110.

The normal read operation of the memory 150 may be performed in response to the instruction of the operation 709 (operation 711). For example, the memory bank BK2 selected by the bank address may be selected, and one column selection signal (for example, YI<18>) selected by the column address may be activated, so that 128-bit normal data may be read from the 128 memory cells corresponding to the column selection signal YI<18> and coupled to the row 72 of the cell array 241_2, and transmitted to the memory controller 110. Furthermore, out of the 128-bit meta data stored in the meta data buffer 220_2, 8-bit meta data corresponding to the 128-bit normal data of the column selection signal YI<18> may be selected and transmitted to the memory controller 110. Out of the 128-bit meta data stored in the meta data buffer 220_2, 8 bits to be transmitted to the memory controller 110 may be selected by the column address. The 128-bit normal data may be first transmitted to the memory controller 110, and then immediately the 8-bit meta data may be transmitted to the memory controller 110.

A normal write operation of the memory 150 may be instructed (operation 713). The memory 150 may receive a normal write command, a bank address, a column address, 128-bit normal write data, and 8-bit write meta data transmitted from the memory controller 110. The memory 150 may first receive the 128-bit normal write data and then immediately receive the 8-bit write meta data.

The normal write operation of the memory 150 may be performed in response to the instruction of the operation 713 (operation 715). For example, the memory bank BK2 may be selected by the bank address, and one column selection signal (for example, YI<20>) selected by the column address may be activated, so that the 128-bit normal write data may be written to 128 memory cells corresponding to the column selection signal YI<20> and coupled to the row 72 of the cell array 241_2. Furthermore, out of the 128-bit meta data stored in the meta data buffer 220_2, 8 bits may be replaced with the write meta data received in operation 713. Out of the 128-bit meta data stored in the meta data buffer 220_2, the 8 bits to be replaced with the write meta data may be selected by the column address.

A meta data write operation of the memory 150 may be instructed (operation 717). The memory 150 may receive a meta data write command, a bank address, and a column address transmitted from the memory controller 110. Because the meta data write operation needs to be performed on the same memory cells as the memory cells on which the meta data read operations (i.e., operations 705 and 707) have been performed, the addresses received in operation 717 may have the same values as the addresses received in operation 705.

The meta data write operation may be performed in the memory 150 in response to the instruction of the operation 717 (operation 719). The 128-bit meta data stored in the meta data buffer 220_2 may be written to 128 memory cells selected by the addresses received in operation 717.

A precharge operation of the memory 150 may be instructed (operation 721). The memory 150 may receive a precharge command and a bank address transmitted from the memory controller 110.

The precharge operation may be performed in the memory 150 in response to the instruction of the operation 721 (operation 723). That is, the active operation of the memory bank BK2 selected by the bank address may be ended.

To perform the normal read operation and the normal write operation, meta data needs to be previously stored in the meta data buffer 220_2. Therefore, the meta data read operation needs to be performed before the normal read operation and normal write operation are performed.

When the normal write operation is performed, because a part of the meta data stored in the meta data buffer 220_2 is changed, the meta data write operation for updating the changed meta data back to memory cells again needs to be performed before the precharge operation. For example, in FIG. 7, when the normal write operations 713 and 715 have not been performed, the meta data write operations 717 and 719 need not to be performed.

Figure 8:
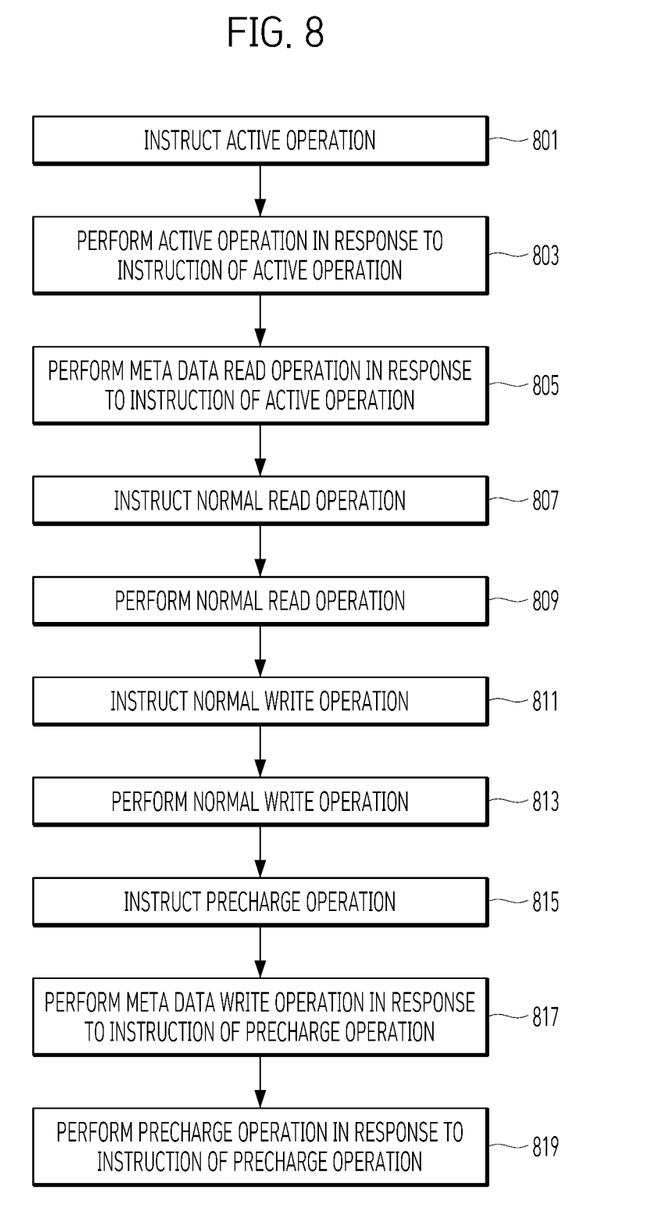
FIG. 8 is a flowchart illustrating an operation of the memory shown in FIG. 2 in accordance with another embodiment of the present disclosure.

FIG. 8 is a flowchart illustrating another embodiment of the operation of the memory 150 of FIG. 2. With reference to FIG. 8, an operation when 128-bit normal data is read and written and 2-bit-meta data is read and written during read and write operations of the memory 150 will be described. That is, with reference to FIG. 8, an operation when the cell arrays 241_0 to 241_3 are configured as illustrated in FIG. 4 or FIG. 6 will be described. The memory bank BK2 is selected in all operations performed in FIG. 8.

Referring to FIG. 8, an active operation of the memory 150 may be instructed first (operation 801). Specifically, the memory 150 may receive an active command, a bank address, and a row address transmitted from the memory controller 110.

The active operation may be performed in the memory 150 in response to the instruction of the operation 801 (operation 803). For example, row 31 selected by the row address in the cell array 241_2 of the memory bank BK2 selected by the bank address may be activated. During the active operation, data of memory cells coupled to the row 31 of the cell array 241_2 may be sensed and amplified.

A meta data read operation may be performed in response to the instruction of the operation 801 of the active operation (operation 805). When meta data read and written at once is 2 bits, all meta data of one row are stored in memory cells corresponding to the column selection signal (YI<0> in FIG. 4 or M_YI in FIG. 6). Furthermore, because all meta data of one row may be stored in the meta data buffer 220_2, the meta data read operation (to be essentially performed) may be performed in response to the instruction of the active operation. 128-bit meta data may be read from 128 memory cells corresponding to the column selection signal YI<0> or M_YI and coupled to the row 31 of the cell array 241_2 of the memory bank BK2, and stored in the meta data buffer 220_2.

A normal read operation of the memory 150 may be instructed (operation 807). The memory 150 may receive a normal read command, a bank address, and a column address transmitted from the memory controller 110.

The normal read operation of the memory 150 may be performed in response to the instruction of the operation 807 (operation 809). For example, the memory bank BK2 selected by the bank address may be selected, and one column selection signal (for example, YI<18>) selected by the column address may be activated, so that 128-bit normal data may be read from the 128 memory cells corresponding to the column selection signal YI<18> and coupled to the row 31 of the cell array 241_2, and transmitted to the memory controller 110. Furthermore, out of the 128-bit meta data stored in the meta data buffer 220_2, 2-bit meta data corresponding to the 128-bit normal data of the column selection signal YI<18> may be selected and transmitted to the memory controller 110. Out of the 128-bit meta data stored in the meta data buffer 220_2, 2 bits to be transmitted to the memory controller 110 may be selected by the column address. The 128-bit normal data may be first transmitted to the memory controller 110, and then immediately the 2-bit meta data may be transmitted to the memory controller 110.

A normal write operation of the memory 150 may be instructed (operation 811). The memory 150 may receive a normal write command, a bank address, a column address, 128-bit normal write data, and 2-bit write meta data transmitted from the memory controller 110. The memory 150 may first receive the 128-bit normal write data and then immediately receive the 2-bit write meta data.

The normal write operation of the memory 150 may be performed in response to the instruction of the operation 811 (operation 813). For example, the memory bank BK2 may be selected by the bank address, and one column selection signal (for example, YI<20>) selected by the column address may be activated, so that the 128-bit normal write data may be written to 128 memory cells corresponding to the column selection signal YI<20> and coupled to the row 31 of the cell array 241_2. Furthermore, out of the 128-bit meta data stored in the meta data buffer 220_2, 2 bits may be replaced with the write meta data received in operation 811. Out of the 128-bit meta data stored in the meta data buffer 220_2, the 2 bits to be replaced with the write meta data may be selected by the column address.

A precharge operation of the memory 150 may be instructed (operation 815). The memory 150 may receive a precharge command and a bank address transmitted from the memory controller 110.

A meta data write operation of the memory 150 may be performed in response to the instruction of the operation 815 (operation 817). The meta data write operation is an operation that needs to be performed before the precharge operation. When meta data read and written at once is 2 bits, because the meta data write operation is performed on the memory cells corresponding to the already determined column selection signal YI<0> or M_YI, the meta data write operation is performed in response to the instruction. The 128-bit meta data stored in the meta data buffer 220_2 may be stored in the 128 memory cells corresponding to the column selection signal YI<0> or M_YI and coupled to the row 31 of the cell array 241_2.

Subsequently, a precharge operation may be performed in response to the instruction of the operation 815 (operation 819). That is, the active operation of the memory bank BK2 selected by the bank address may be ended.

In FIG. 8, the active operation and the meta data read operation are performed in response to the instruction of the active operation, and the meta data write operation and the precharge operation are performed in response to the instruction of the precharge operation. Accordingly, the number of times by which commands and addresses are applied from the memory controller 110 to the memory 150 may be reduced.

In the embodiments described above, the normal data read and written at once is 128 bits and the meta data read and written at once is 8 bits or 2 bits; however, this is merely an example and the number of bits of normal data and the number of bits of meta data may be different.

Although embodiments according to the technical idea of the present disclosure have been described above with reference to the accompanying drawings, this is only for describing the embodiments according to the concept of the present disclosure, and the present disclosure is not limited to the above embodiments. Various types of substitutions, modifications, and changes for the embodiments may be made by those skilled in the art, to which the present disclosure pertains, without departing from the technical idea of the present disclosure defined in the following claims, and it should be construed that these substitutions, modifications, and changes belong to the scope of the present disclosure. Furthermore, the embodiments may be combined to form additional embodiments.

What is claimed is:

1. An operation method of a memory, the operation method comprising:
   receiving a meta data read command and a first address;
   reading meta data from memory cells coupled to columns corresponding to the first address and storing the read meta data in a meta data buffer;
   receiving a normal read command and a second address;
   reading normal read data from memory cells coupled to columns corresponding to the second address; and
   outputting the normal read data and a portion of the meta data stored in the meta data buffer, the portion being selected based on the second address.

2. The operation method of claim 1, further comprising:
receiving a normal write command, a third address, normal write data, and write meta data;
writing the normal write data to memory cells coupled to columns corresponding to the third address;
replacing meta data selected by the third address from the meta data stored in the meta data buffer, with the write meta data;
receiving a meta data write command; and
writing the meta data stored in the meta data buffer to the memory cells coupled to the columns corresponding to the first address.

3. The operation method of claim 2, further comprising, before receiving the meta data read command and the first address:
receiving an active command and a fourth address; and
activating a row corresponding to the fourth address.

4. The operation method of claim 3, further comprising, after writing the meta data stored in the meta data buffer:
receiving a precharge command; and
precharging a row corresponding to the fourth address.

5. An operation method of a memory, the operation method comprising:
receiving a meta data read command and a first address;
reading meta data from memory cells coupled to columns corresponding to the first address and storing the read meta data in a meta data buffer;
receiving a normal write command, a second address, normal write data, and write meta data;
writing the normal write data to memory cells coupled to columns corresponding to the second address;
replacing, with the write meta data, a portion of the meta data stored in the meta data buffer, the portion being selected based on the second address;
receiving a meta data write command; and
writing the meta data stored in the meta data buffer to the memory cells coupled to the columns corresponding to the first address.

6. The operation method of claim 5, further comprising, before receiving the meta data write command:
receiving a normal read command and a third address;
reading normal read data from memory cells coupled to columns corresponding to the third address; and
outputting the normal read data, and meta data selected by the third address from the meta data stored in the meta data buffer.

7. The operation method of claim 6, further comprising, before receiving the meta data read command and the first address:
receiving an active command and a fourth address; and
activating a row corresponding to the fourth address.

8. The operation method of claim 7, further comprising, after writing the meta data stored in the meta data buffer to the memory cells coupled to the columns corresponding to the first address:
receiving a precharge command; and
precharging a row corresponding to the fourth address.

9. An operation method of a memory, the operation method comprising:
receiving an active command and a first address;
activating a row corresponding to the first address in response to the active command;
reading meta data from meta data memory cells coupled to the row in response to the active command and storing the read meta data in a meta data buffer;
receiving a normal read command and a second address;
reading normal read data from memory cells coupled to columns corresponding to the second address in response to the normal read command; and
outputting, in response to the normal read command, the normal read data, and a portion of the meta data stored in the meta data buffer, the portion being selected based on the second address.

10. The operation method of claim 9, further comprising, after the outputting the normal read data:
receiving a precharge command; and
precharging a row corresponding to the first address in response to the precharge command.

11. The operation method of claim 9, further comprising, after the outputting the normal read data:
receiving a normal write command, a third address, normal write data, and write meta data;
writing, in response to the normal write command, the normal write data to memory cells coupled to columns corresponding to the third address; and
replacing, in response to the normal write command, meta data selected by the third address from the meta data stored in the meta data buffer, with the write meta data.

12. The operation method of claim 11, further comprising, after the replacing:
receiving a precharge command; and
writing, in response to the precharge command, the meta data stored in the meta data buffer to the meta data memory cells; and
precharging a row corresponding to the first address in response to the precharge command.

13. An operation method of a memory, the operation method comprising:
receiving an active command and a first address;
activating a row corresponding to the first address in response to the active command;
reading meta data from meta data memory cells coupled to the row in response to the active command and storing the read meta data in a meta data buffer;
receiving a normal write command, a second address, normal write data, and write meta data;
writing, in response to the normal write command, the normal write data to memory cells coupled to columns corresponding to the second address;
replacing, in response to the normal write command, with the write data, a portion of the meta data stored in the meta data buffer, the portion being selected based on the second address;
receiving a precharge command;
writing, in response to the precharge command, the meta data stored in the meta data buffer to the meta data memory cells; and
precharging the row corresponding to the first address in response to the precharge command.

14. A memory comprising:
a memory bank;
a meta data buffer configured to receive meta data read from the memory bank and temporarily store the received meta data, the meta data being selected based on a first address, during a meta data read operation; and
a data input/output circuit configured to output normal data read from the memory bank, the normal data being selected based on a second address, and a portion of the meta data stored in the meta data buffer, the portion being selected based on the second address, during a normal read operation.

15. The memory of claim 14, wherein, during a normal write operation:
   the data input/output circuit is configured to receive normal write data and write meta data,
   the meta data buffer is configured to replace a part of the stored meta data with the write meta data, and
   the memory bank is configured to store the normal write data.

16. The memory of claim 15, wherein, during a meta data write operation, the meta data stored in the meta data buffer is transmitted to and stored in the memory bank.

17. The memory of claim 14, wherein the memory includes a plurality of the memory banks, and includes meta data buffers corresponding to the plurality of memory banks, respectively.

18. The memory of claim 17, wherein each of the meta data buffers temporarily stores meta data stored in a memory bank corresponding to each of the meta data buffers among the plurality of memory banks.

* * * * *